June 11, 1957   B. B. BAUER   2,795,168
APPARATUS FOR DETERMINING PROPER CONTRAST-GRADE OF
PHOTOSENSITIVE PAPER AND EXPOSURE TIME
IN MAKING PHOTOGRAPHIC PRINTS
Filed May 28, 1956   4 Sheets-Sheet 2

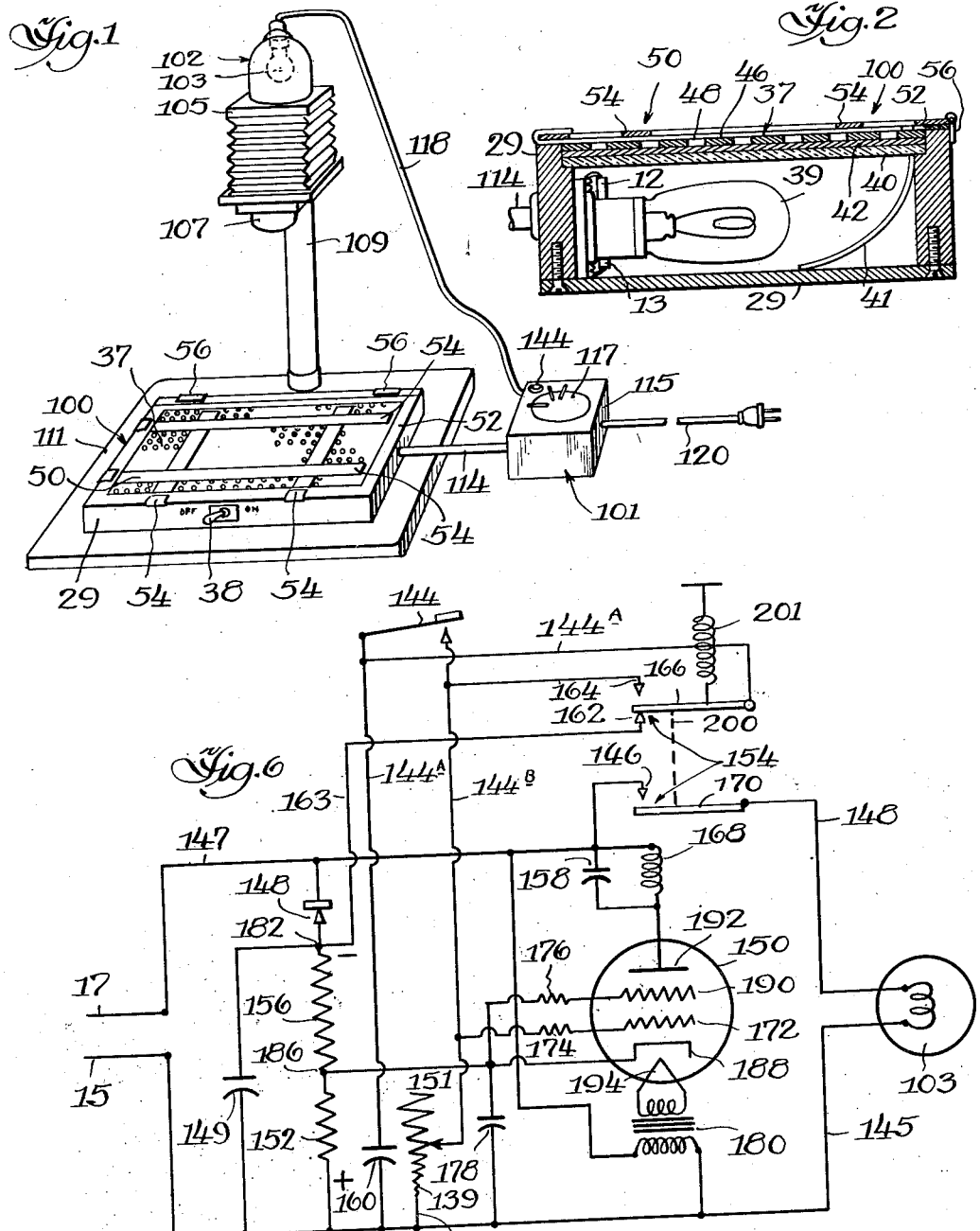

Inventor,
Benjamin B. Bauer,
By: Jones, Tesch + Darbo
Attys.

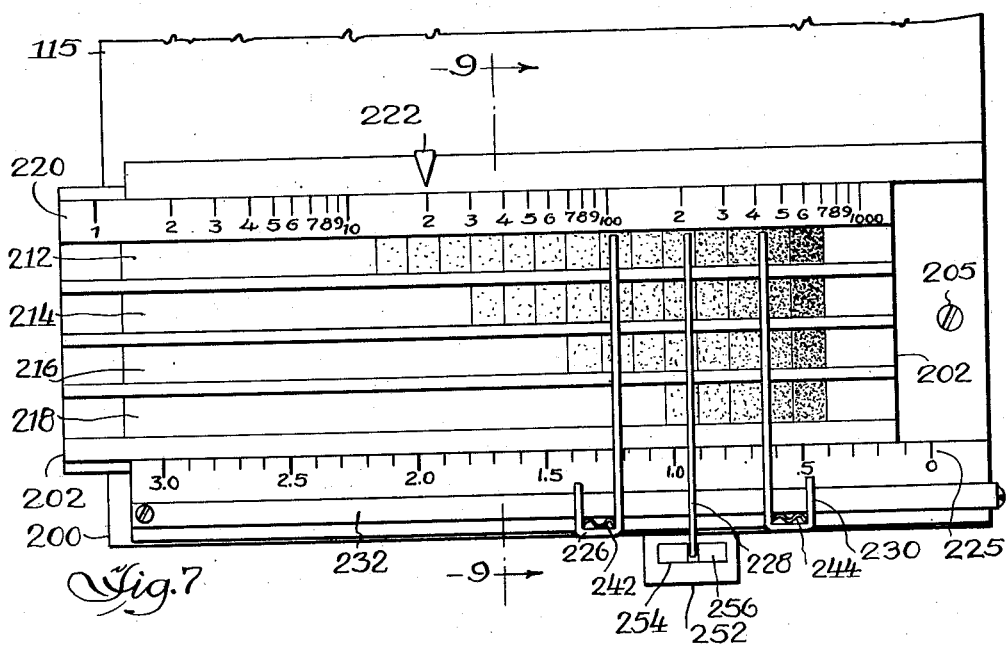
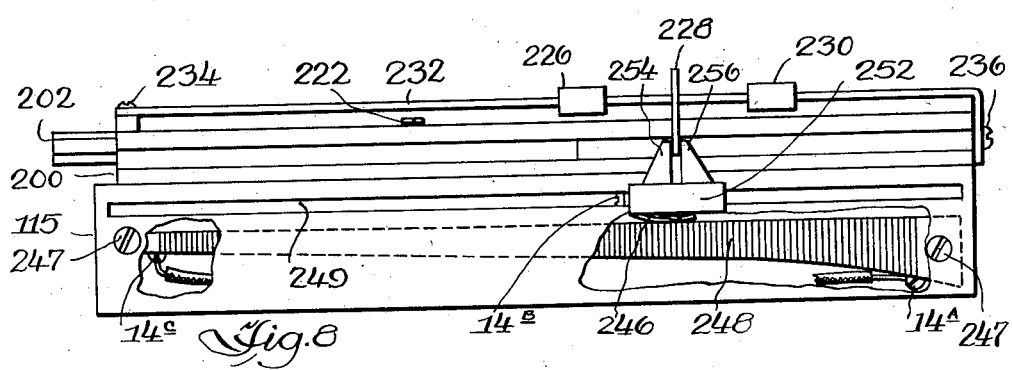
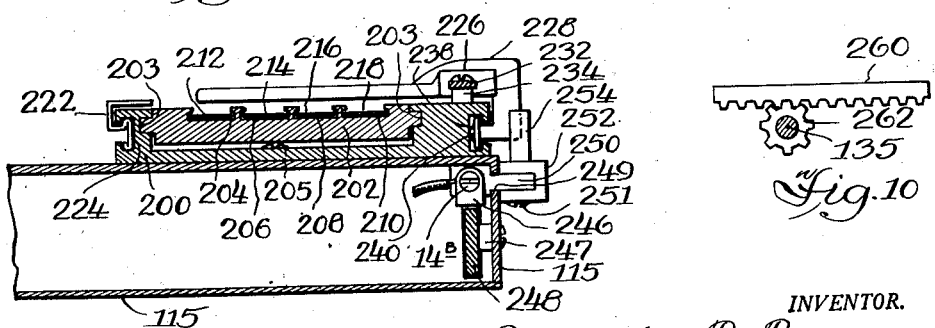

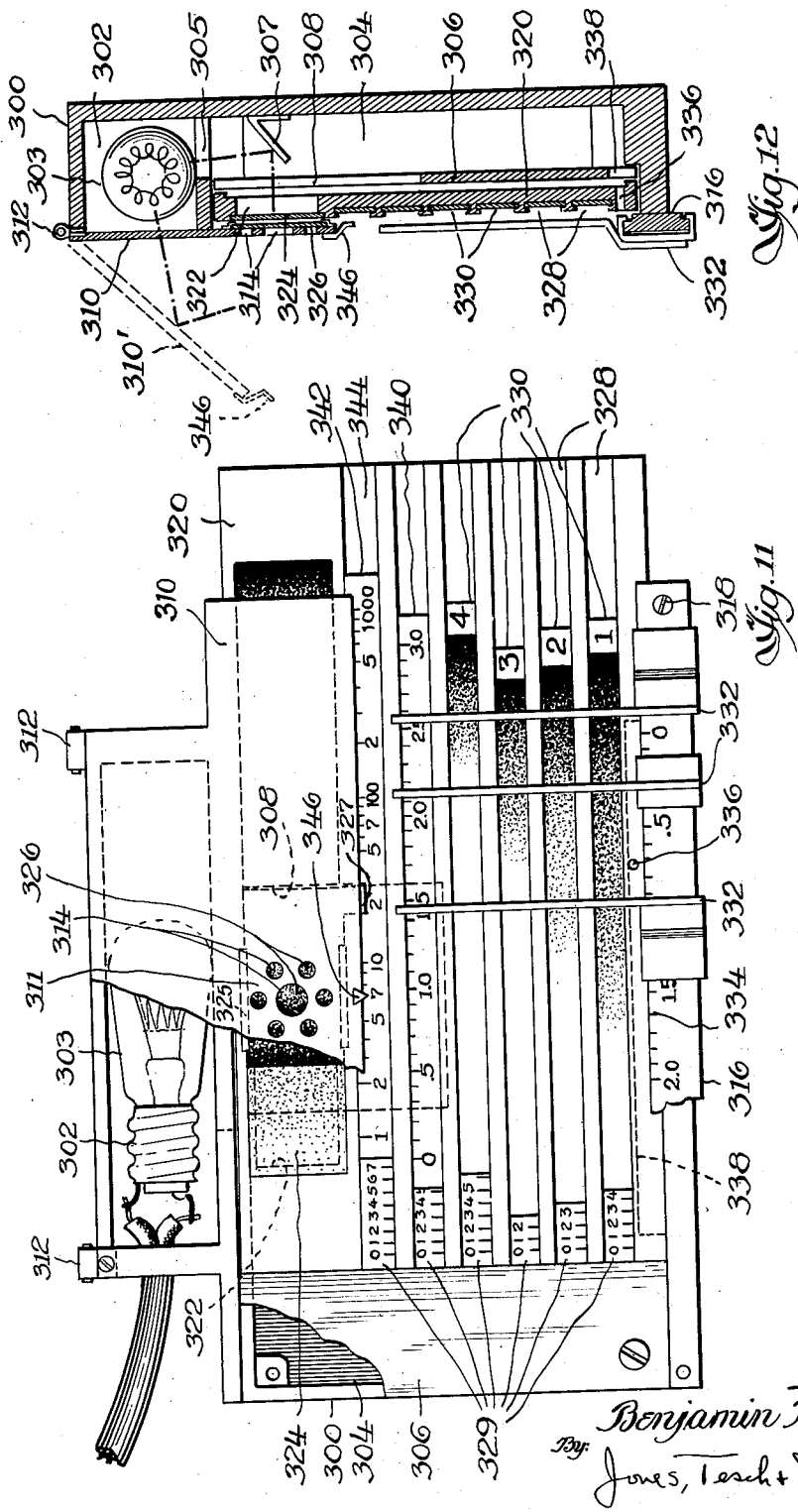

United States Patent Office 2,795,168
Patented June 11, 1957

2,795,168

APPARATUS FOR DETERMINING PROPER CONTRAST-GRADE OF PHOTOSENSITIVE PAPER AND EXPOSURE TIME IN MAKING PHOTOGRAPHIC PRINTS

Benjamin B. Bauer, Oak Park, Ill.

Application May 28, 1956, Serial No. 587,536

31 Claims. (Cl. 88—24)

In the art of photographic printing there is the problem of selecting the proper contrast-grade of photosensitive paper to be used with a given negative image and the amount of exposure to be given the printing paper in order to achieve the desired rendition of the subject. Most commonly, the photographer selects the contrast-grade of the paper to be used by visual inspection of the image. Thereupon, he exposes a test-strip of the paper thus selected by a progression of time steps, followed by full development and a brief fixation. From this test-strip he is able to estimate if his initial selection of contrast-grade has been satisfactory. In the affirmative case, he is able to choose by trial and error the exposure time which will produce the desired photographic result. In the negative case he proceeds to select a paper of greater or lesser contrast-grade, as the case may be, and repeats the test-strip procedure until the desired result is obtained. Thereupon he proceeds to expose the final print from the image. This procedure is wasteful of time and paper, and attempts have been made to provide suitable photometers and calculators for mechanical selection of the contrast-grade of the paper and exposure time.

It is the principal object of the present invention to provide improved apparatus of this character.

The apparatus of the invention provides a realization of the following desirable results: rapid and simple determination of the manner in which given portions of the image will be rendered on any desired photographic printing medium; easy and accurate selection of the contrast grade or processing of the printing medium which will provide the most satisfactory reproduction of an image; the determination without the use of test strips of the exposure time for the selected medium to achieve the desired aristic result.

Another object is to provide in one instrument a photographic contrast and exposure selector and a timer which will automatically set the exposure time and eliminate errors and delays.

Another object is to provide in one instrument a photographic contrast and exposure selector and a photometer by means of which contrast grade and exposure time can both be determined without the need of separately reading the density of the given porions of the image.

A still further object is to provide in one instrument an exposure calculator coupled to a photometric screen-type photometer having a photographic easel. Additional objects will become apparent as this specification proceeds wherein there are described illustrative embodiments of the invention. The description is to be read in conjunction with the accompanying drawings in which:

Fig. 1 is a perspective view of an embodiment of the apparatus of the invention;

Fig. 2 is an elevational view in section of the photometric unit of the apparatus of Fig. 1;

Fig. 5 is a fragmental view of the gear-type of adjustment means for the internal light source, on line 5—5 of Fig 4;

Fig. 6 is a diagrammatic view of an electronic timer element such as may be used with the apparatus of the invention;

Fig. 7 is a plan view of a different embodiment of exposure selector in accordance with the invention;

Fig. 8 is an elevation of the apparatus of Fig. 7, with several portions broken away to show internal structure;

Fig. 9 is a sectional view along the line 9—9 of Fig. 7;

Fig. 10 is a fragmental view of a rack and pinion arrangement for connecting the exposure selector of Figs. 7, 8 and 9 to the exposure control of Figs. 1 to 6;

Fig. 11 is a plan view, partly broken away, of a further embodiment of the invention;

Fig. 12 is a cross sectional view of the embodiment of Fig. 11, and

Fig. 13 is a side view of a portion of the device of Fig. 11.

Figure 3:
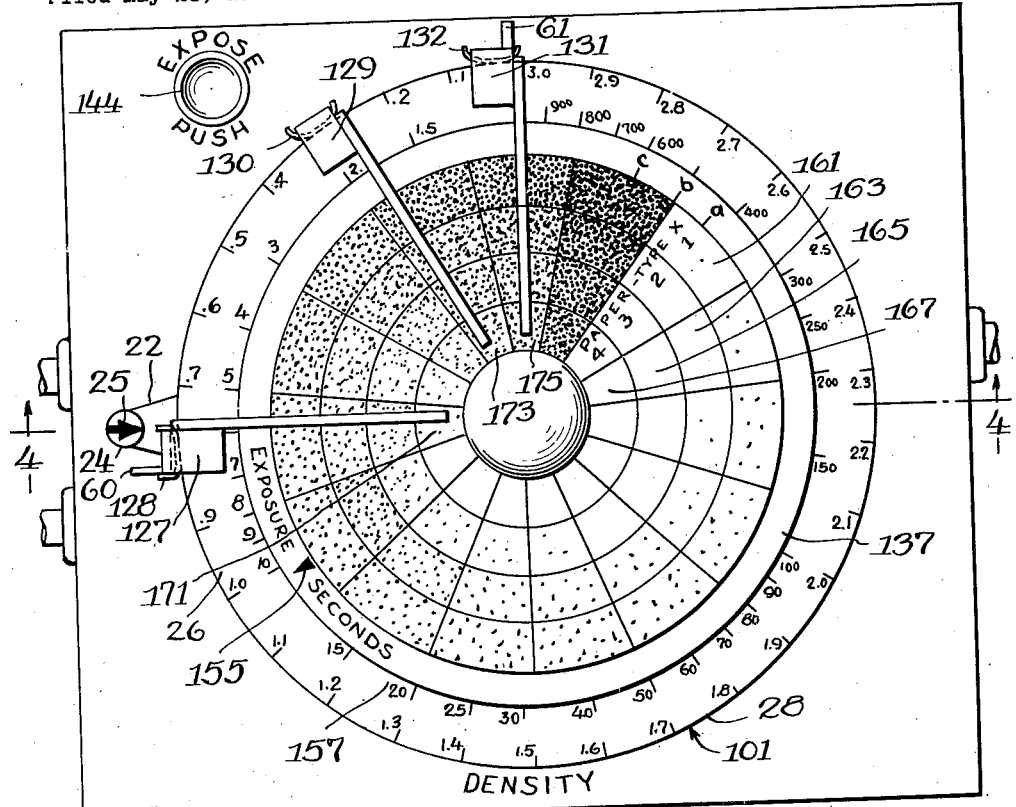
Fig. 3 is a plan view of the control unit.

Referring to Fig. 1, the photographic enlarger 102 is of conventional construction comprising a lamp 103, a negative holder 105, a lens and diaphragm member 107, a supporting post 109, and a base 111. These components are conventional and will not be described. On the base 111 is a photometric easel 100 electrically connected by a lamp-cord 114 to a control unit 101 which is provided with a calculator. These latter features are the subject of the present invention and will be described hereinafter. The control unit 101 is connected by cord 118 to the lamp 103, and by cord 120 to a suitable energy supply, which may be a conventional 110 volt alternating current circuit.

The photometric easel 100 comprises a photometric unit proper, constructed as described in my Patent No. 2,732,757. Said unit is provided with a suitable paper holding frame 50 which cooperates with the top surface of the unit to form an easel. Said unit consists of an open-top housing 29 containing one or more lamps 39 connected to the supply conductors 12 and 13 contained in cord 14. A switch 38 is mounted on a side wall of housing 29 and is connected in the supply circuit for lamps 39. The lamps provide internal illumination for the photometric unit. Across the open top of the housing 29 is the photometric screen 37. The interior surface of the housing may be made highly light-reflective as by a coating of reflective paint, or a suitable reflector 41 may be used, whereby the illumination of the interior surface of the photometric screen 37 is relatively uniform.

In the embodiment shown, the screen 37 is composed of three elements, the lowermost being a sheet or plate 40 of transparent or preferably translucent material such as clear or frosted glass. Upon the sheet 40 is a sheet 42 of translucent light-transmitting material which has a dark colored upper surface. The transmission characteristic of sheet 42 preferably varies over its area in a manner substantially inversely to the illumination of the sheet by the lamp or lamps 39. In this manner, the transmission of light through the sheet 42 is substantially uniform over the area of the sheet. This characteristic of sheet 42 is conveniently obtained by employing a sheet of photographic positive paper and incompletely exposing it when in position on plate 40 and then developing and fixing the sheet. The exposure is carried to the point where the sensitized surface is at a tone no lighter than a dark gray at its lightest area.

The sheet 42 is for convenience referred to herein as a quasi-black body sheet. As is described in Patent No. 2,732,747, several sheets of incompletely exposed sensitized paper may be used in place of the single sheet 42 to obtain more perfect compensation for the unevenness of internal illumination, but for convenience only one sheet is illustrated in the embodiment described herein.

Upon the sheet 42 is an apertured sheet 46 which is substantially opaque and has a light-reflective upper surface, said surface preferably being diffusely reflective and having a coefficient of light-reflectivity of 0.5 or greater and at least two times the coefficient of light-reflectivity of the quasi-black body sheet 42. The upper surface of sheet 46 preferably is pebbly grained, like the surface of the glass bead type of projection screen.

Hinged to the upper portion of the housing 29 is a paper holding frame 50 which may be of conventional construction. The frame of the embodiment illustrated consists of an outer frame member 52 substantially coinciding with the periphery of the housing 29 and having two paper holding strips 54 extending inwardly from each of two adjacent sides of member 52. The strips 54 are slidable along the sides of member 52 so as to accommodate various sizes of photographic paper. The frame is hinged to housing 29 by the hinges 56 and may be raised to permit the insertion of the photographic paper upon the screen 37 after which the frame is lowered to hold the paper in place.

The photometric unit may be utilized in the manner disclosed in my above-identified patent to obtain simply and rapidly a measure of the density of different portions of the negative. Certain exposing and light balancing operations are involved in the procedures to be described herein and it is to be understood that such operations are carried out in a suitably darkened space and this factor will not be mentioned hereinafter in this specification. The negative is placed in the negative holder 105 of the enlarger 102 and lamp 103 is suitably energized whereby an image of the negative is projected upon the screen 37. The internal illumination source 39 is then adjusted by regulating the voltage applied to the supply conductors 12 and 13 by means of control member 101 in a manner to be described hereinafter. The internal illumination is initially set at zero, and at this setting the reflective sheet 46 shows up bright and the apertures 48 show up dark by reason of the absorption of light by the quasi-black body sheet 42. Illumination is then increased until the first aperture or apertures 48 disappear, which occurs when the illumination transmitted from the internal source at said apertures equals the illumination reflected from the sheet 46 immediately adjacent to said apertures. This condition of light balance occurs at the area of the projected image corresponding to the densest area of the negative, which will be the highlight of a print taken from the negative. By suitable measuring means disclosed in my aforementioned patent, a measurement of the illumination at this setting is obtained, which measurement is proportional to the projection density of the negative at its densest area. The illumination is then increased until the last aperture or apertures 48 disappear, and a measurement is obtained in a manner similar to that described for the intensity of internal illumination proportional to the projection density of the negative at its lightest area. In this same manner, a measurement may be obtained of the density of the negative at any desired area thereof. This procedure will herein be called the light-balancing procedure. Also, where density is referred to herein as obtained upon the photometric unit herein described, it is to be understood that the property being measured is projection density. Such measurement need be only relative rather than absolute. Other methods of measuring density are known and may be employed in cooperation with the apparatus described herein.

Figure 4:
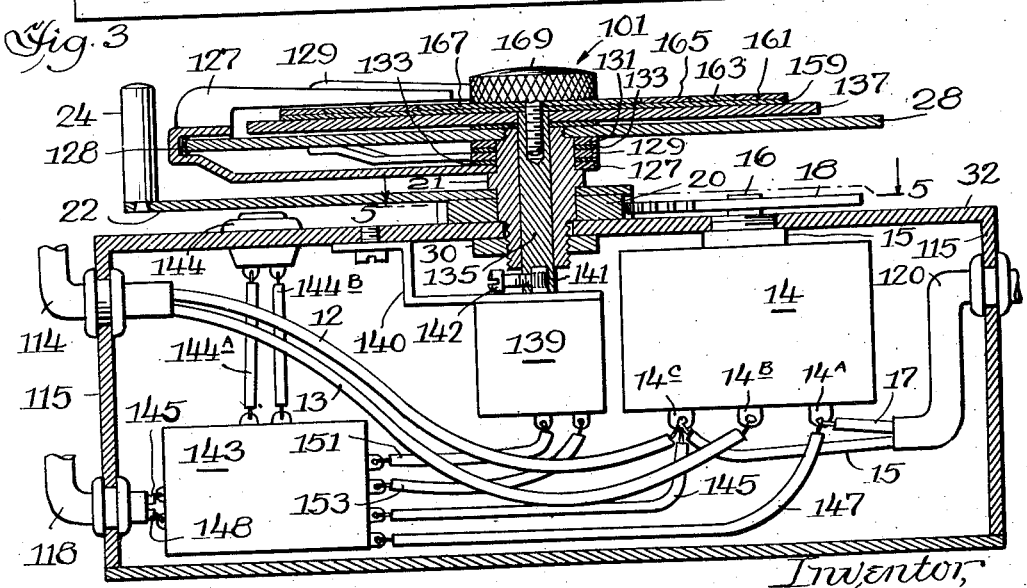
Fig. 4 is a sectional view along line 4—4 of Fig. 3.

The control unit 101 is located in the housing 115 and consists of a variable potentiometer-type rheostat 14 mounted by means of the boss 15 on the top wall 32 of the housing 115. The rheostat has a resistance-adjusting shaft 16 passing through boss 15 and to which is fixed a gear 18 engaging a pinion 20 which is free to rotate on the post 21. Post 21 is mounted fixedly upon the central portion of the top wall 32 and projects upwardly therefrom. The lower end of post 21 is of reduced diameter and passes through an opening in wall 32 and is fixed in position by the threaded nut 30. The input terminals 14A and 14C of the rheostat are connected by conductors 15 and 17 to the energy supply line 120 and the output terminals 14B and 14C thereof are connected by conductors 12 and 13 to the cord 114 leading to the photometric unit. The pinion 20 is suitably connected as by soldering to lever 22 which is provided at its outer end with a handle 24. Said handle may have marked thereon an indicator arrow or pointer 25. Thus the setting of the rheostat can be controlled by angular movement of the handle 24 about the post 21, and the intensity of internal illumination of the photometric easel 100 is thereby regulated. By following the light balancing procedure described heretofore and in the aforementioned patent, angular positions of the rheostat can be found which correspond to or are measurements of values of the density of given portions of a negative placed in the negative holder 105 and the image of which is projected on the photometric screen 37. By suitably constructing the taper of the windings of the rheostat 14, in accordance with known design procedure, angular displacements of the shaft 16 may be caused to correspond to proportionate changes in density values, thereby providing what is known as a linear scale. Following this calibration procedure with a rheostat provided with properly tapered windings values of density of a negative image may be recorded on a scale confronting the indicator 25. Such a scale 26 is provided upon the disk 28 which is fixed upon post 21 by means of the threaded opening in the disk as shown in Fig. 4. In this embodiment, equal increments of density correspond to equal increments of spacing upon the linear scale 26.

Other means may be used to obtain a linear density scale, instead of a rheostat having specially shaped windings. For example, the gear 18 and the pinion 20 may be so shaped that angular displacement of the pinion causes the proper angular displacement of the gear to produce linear calibration on the scale 26. Such a pinion and gear are illustrated in Fig. 5.

By appropriate choice of rheostat windings and number of teeth on gear 18 and pinion 20, one complete revolution of the handle 24 may be caused to correspond to any arbitarily chosen total range of density. A total range is suitable which will cover the density variations which are expected in the negative to be printed, and in the embodiment described and illustrated herein such total range is from a value of 0 to a value of 3.0. The density of a photographic negative is by definition the negative logarithm of the relative transparency or light transmission property thereof with zero representing total or 100% transmission. A range of density of 0 to 3.0 corresponds to a transmission ratio of 1000 to 1; therefore a one-third revolution of the handle 24 corresponds to a change of density of 1.0 and to a change in transmission by a ratio of 10:1. This choice of values is not unique but is found to be convenient, being sufficient to measure the density of the vast majority of photographic negatives encountered in practice. Other relationships of density to angle of rotation of the handle 24 may be used with equal success.

Mounted upon and for rotation about the post 21 are markers 127, 129 and 131. The markers are each in the form of an elongated arm having an opening at one end whereby it fits upon post 21 beneath disk 28. The arm extends outwardly from the post 21 slightly beyond the edge of disk 28 and is then bent around the edge of the disk and extends radially inwardly a substantial distance adjacent to the upper surface of the disk. The latter portion of the arm is spaced from the surface of the disk 28 to accommodate elements which will be described hereinafter. While the markers are shown to be three in number, any desired number may be employed. They are separated from each other for free rotation by means of washers 133, and are adjustably held in position by resilient friction members 128, 130 and 132 which engage the edge of disk 28. The purpose of these markers is to indicate the density of various portions of the negative, in the manner to be hereinafter described.

Arranged for rotation within a bore in the post 21 is a shaft 135 which extends beyond the post 21 at both ends thereof. Firmly attached to the upper end of the shaft 135, as by a press fit, is a disk 137. The shaft and the disk may be of any suitable material, such as metal or plastic. At its lower end shaft 135 is connected to shaft 141 which, in turn, is connected to the sliding contact of the adjustable rheostat 139. The end of shaft 141 is received in a recess in the end of shaft 135 and the two shafts are connected together in motion-transmitting relationship by means of set-screw 142. The rheostat 139 is mounted upon the upper wall 32 of housing 115 by means of arm 140. The shaft 135 is operated by a knurled knob 169 which has a shank which is threaded into a recess in the upper end of the shaft. The knob 169 also holds a disk 159 in angularly adjustable relation to shaft 135 and disk 137 as will be described hereinafter.

The rheostat 139 is a time controlling means which controls the timing action of the electronic time-delay relay or timer 143 shown symbolically in Fig. 4. The timer 143 regulates the period during which the lamp 103 of the enlarger 102 is energized in the making of a print. The construction of electronic time-delay relays is known and any suitable relay may be used. A suitable construction adapted for use with a conventional alternating current supply is shown diagrammatically by way of illustration and not of limitation in Fig. 6.

The conductor 145 is connected to the energy supply conductor 15 and proceeds through the timer to the cord 118 and the enlarger lamp 103. The other conductor 147 is connected to the supply conductor 17 and proceeds to the contact 146 of the magnetic relay 154, which will be described hereinafter. From the arm 170 which cooperates with contact 146 the conductor 148 proceeds to the lamp 103. The relay 154 controls the supply of energy to the lamp and in turn is controlled by the timing apparatus. The immediate control for the relay is the circuit of the vacuum tube 150 which may be of any suitable type and preferably is of the gas-filled type commonly used for switching purposes. Tube 150 contains a heater element 194, a cathode 188, a control grid 172, a screen grid 190 and a plate 192.

The timer circuit includes a rectifier 148 which has one terminal connected to the conductor 147 and the other terminal connected to one terminal of capacitor 149. The other terminal of capacitor 149 is connected to the conductor 145. The rectifier is so connected that a potential is developed at the junction 182 between the capacitor and the rectifier which is negative with respect to the conductor 145. Resistors 156 and 152 are connected in series between junction 182 and conductor 145, the junction between said resistors being designated by the numeral 186. Said junction 186 is connected to the cathode 188 of vacuum tube 150. Resistors 156 and 152 form a voltage divider resulting in a substantial voltage drop across the resistor 152. Across the resistor 152 is connected capacitor 178 which is constructed so as to permit the easy passage of the conventional alternating current. Tube 150 has the property of conducting rectified alternating current from the plate to the cathode when the grid 172 is positive with respect to the cathode and to stop the current when the grid 172 is negative with respect to the cathode. For best operation, I have found it desirable to connect the screen grid 190 to the cathode 188 through a resistor 176. The relay 154 has an operating coil or solenoid 168 which is connected between the conductor 147 and the plate 192. I have found it desirable to place a capacitor 158 in parallel with the solenoid 168 to eliminate chatter of the relay. The heater 194 is energized by the transformer 180, the primary of the latter being connected between the conductors 145 and 147.

The relay 154 has three sets of contacts actuated by the solenoid 168: contact 146 which is closed by the arm 170 during the exposure cycle as will be hereinafter described; contact 164 which is closed by the arm 166 during the exposure cycle, and contact 162 which is opened by the arm 166 during the exposure cycle. Arms 166 and 170 are connected together in motion-transmitting relationship by the arm 200 and are moved to the upper position in which arm 166 engages contact 164 and arm 170 engages contact 146 by tension spring 201 when solenoid 168 is deenergized. The contact 162 is connected by conductor 163 to the junction 182 which is negatively charged with respect to the conductor 145 as is explained heretofore, and the arm 166 is connected by conductor 144A to one terminal of a capacitor 160, the other terminal of said capacitor being connected to the supply conductor 145. The contact 164 is connected by by conductor 144B to one terminal of the rheostat 139 and also to control grid 172 of vacuum tube 150 through the resistor 174. The other terminal of said rheostat 139 is connected to the supply conductor 145. A momentary contact switch 144 is connected between the conductors 144A and 144B.

Normally, with the switch 144 in the open position, the grid 172 is at the same potential as the conductor 145, which potential is positive with respect to the junction 186 as described heretofore, and hence is positive with respect to cathode 188. Therefore, the tube 150 is conductive, and current will flow from the conductor 147 through the solenoid 168, the tube 150, and the capacitor 178 to the conductor 145, causing the arms 170 and 166 to be held in the downward position. Under such condition, the circuit is open at contact 146, whereby lamp 103 is deenergized. At the same time the circuit is open at contact 164 and closed at contact 162, whereby the upper terminal of the capacitor 160 is connected to the junction 182 and a negative charge is imparted to said capacitor.

To produce a timing cycle, the switch 144 is momentarily closed, thereby establishing contact from the negatively charged upper terminal of the capacitor 160 to the grid 172 of the tube. This negative charge stops the flow of current through the solenoid 168, permitting the arms 166 and 170 to move upwardly, thus closing the circuit at contact 146 and energizing the lamp 103. At the same time, the arm 166 opens the circuit at contact 162 and closes it at contact 164, thus disconnecting capacitor 160 from the source of charging potential and permitting it to discharge through the rheostat 139. The potential difference across the terminals of the capacitor 160 will diminish as an exponential function of time depending upon the capacity of the capacitor 160 and the setting of the rheostat 139. As long as the potential difference between the capacitor terminals exceeds by a few volts the voltage drop across the resistor 152, the net bias upon the grid 172 with respect to the cathode 188 is negative and the tube will not conduct current. Under such conditions, solenoid 168 continues to be deenergized, the circuit remains closed at contact 146 and lamp 103 is energized. As soon as the potential difference between the capacitor terminals becomes less than the voltage drop across the resistor 152, the tube becomes conductive, current flows in solenoid 168, the relay switch 154 is restored to its original condition and lamp 103 is deenergized.

The time of exposure is dependent on the charge upon the capacitor 160 when switch 144 is depressed and the ohmic value of the rheostat 139 at the existing setting thereof. The selection of suitable circuit constants for the various elements, such as the voltage across the capacitor 149, the capacity of the capacitor 160 and the resistance of the rheostat 139 and the resistors 156 and 152 is a matter known to a person skilled in the art. For example they may be so selected that when the sliding contact of the rheostat 139 is at the position of maximum resistance, a suitable maximum exposure time, say 100 seconds, results.

The taper of the winding of rheostat 139 is arranged to be such that angular displacement of the sliding contact thereof by the shaft 135 is proportional to the logarithm of the exposure time. In the embodiment described herein, the design is such that rotation of the shaft through 120° corresponds to a ten-fold time change of the "on" time of the enlarger. This change of exposure time with angular rotation of the sliding contact of rheostat 139 corresponds to the change of density with angular rotation of the handle 24 chosen for the photometric unit proper of easel 100. The scale of exposure time 157 is drawn on the disk 28 in a circle located interiorly of density scale 26 and adjacent to the edge of disk 137. Intervals of equal space on scale 157, i. e., the linear intervals thereof, correspond to equal increments of the logarithm of exposure time. The disk 137 rotates with the shaft 135 and hence with the sliding contact of the rheostat, and an arrow 155 or other suitable indicator mark is placed upon the disk and in cooperation with scale 157 provides an indication of the exposure time for which the timer 143 is set. The scale 157 need not bear any particular positional relation to scale 26. The only relationship required is that values of the logarithm of the exposure time on scale 157 change at approximately the same proportionate rate as, or otherwise in conformity with, the values of density on the scale 26, and that the latter scale be approximately linear with the angle of rotation. For convenience, the scale 157 is calibrated directly in seconds of exposure time.

While the scale 157 in Fig. 2 is shown as embracing exposure time intervals from 1 second to 1000 seconds, such a wide range of adjustment usually is not necessary. A range from one second to 100 seconds is generally sufficient for most practical purposes. These ranges are not given as limiting values, but merely as values which have been found to be suitable.

While an electronic timer has been shown in the embodiment of Fig. 3, this was done merely as a matter of convenience. A mechanical timer, or any other suitable timer adapted to control the exposure time and having time adjusting means adapted to be adjusted by the shaft 135 in conformity with the density scale is equally suitable. For example, instead of controlling the rheostat 139, the shaft 135 may control a value which actuates a dash-pot timer in a well known manner. Since various types of timers are known to the art, a detailed description will not be given herein.

Affixed to the disk 137 in an adjustable manner is a disk 159, which may be made of metal, cardboard, or any suitable material, to which are attached as by cementing a number of gray step-wedge scales in the form of concentrically arranged annular rings 161, 163, 165 and 167. Each of these rings is a gray step-wedge scale. These rings may be prepared by the following steps: Firstly a circular photographic step-wedge is prepared having any desired number of angular segments, preferably 10 to 20, the segments being of equal size and the angular variation in density throughout each step-wedge scale being in conformity with the variation in density represented by scale 26. Such a wedge is conveniently prepared from two commercially available circular wedge scales or projection print scales. Each of these has ten segments of which the densest has a density of approximately 1.50. In one scale, the half of the densest segment adjacent to the least dense segment is removed and in the other half of the least dense segment adjacent to the densest segment is removed. The two scales are superimposed and displaced angularly with respect to each other by 18° in such manner that the two removed half-segments are in registry and then the scales are fixed together as by cement. A step-wedge is thereby obtained having 20 steps with a minimum density of zero and a maximum density of approximately 3.0, thereby having an average angular variation of density equal to 1.0 per 120°, which is in conformity with density scale 26. Instead of a step-wedge, a graduated density wedge can be used, provided it has a suitable angular change in density.

Secondly, cord 120 is connected to a source of energy, and the handle 24 is set to zero density position and switch 38 is closed to energize the source of internal illumination 39. Knob 169 is turned to a position providing an exposure time sufficient to carry out the adjustment to be described, and switch 144 is depressed to energize enlarger lamp 103. With the negative removed from the holder 105, the light projected upon the easel is adjusted by means of the diaphragm of the lens 107 until a light balance is obtained on the photometric screen 37.

Thirdly, with the switch 38 turned to the "off" position and enlarger light adjusted as in step 2 a series of photographic reproductions is made of the circular step-wedge by contact printing on photographic paper of different contrast grades and preferably of the same brand. The same exposure time is used for each printing operation, this latter time being chosen by experiment to be great enough that the slowest paper of the series produces a black or a fully exposed tint at the most transparent segment of the step-wedge.

Fourthly, the positives thus obtained are developed, fixed, and dried in the usual manner; such positives will herein be called gray scales, and each such gray scale represents the density tonal value-exposure relationship, which is characteristic of the photosensitive paper of which it is composed. Exposure intervals of equal space on the gray scales, i. e., the linear intervals thereof, correspond to equal increments of the logarithm of exposure, and therefore are in conformity with the density intervals on the density scale 26.

Fifthly, each gray scale is cut to form one of the annular rings 161, 163, 165, etc. and they are mounted concentrically upon disk 159 in such a manner that the segments of maximum density are in radial alignment as shown in Fig. 3. The rings may be cemented to the disk 159. The disk 159 is adjustably held in place with respect to disk 137 by the threaded knob 169 and is arranged so that when the indicator 155 on disk 137 points to the time on scale 157 equal to the time for which the gray scales were exposed the segments of the concentric annular gray scale rings confront the proper density readings on scale 26. For example, if the densest segments of the rings have been made with a step having a density of zero, then the disk 159 is adjusted with respect to the disk 137 so that the densest segments thereof confront the zero position on scale 26.

It is seen, therefore, that in my invention a plurality of gray scales is provided representing the density tonal value-exposure characteristics of a series of photosensitive papres of various contrast grades. The markers 127, 129 and 131 are adapted to act as indexes for all of these scales simultaneously, and to indicate at a glance the suitability of the various papers for making prints from a given negative. After preparation of the gray scales in the indicated manner, they may be duplicated by any one of the known printing processes as a single disk containing all the desired annular scales.

One example of the use of the apparatus is as follows: First, with the switch 38 in the open position, the negative to be reproduced is placed in the negative-holder 105 and is focused upon the photometric screen 37 of the easel 100. The position of the easel on the base 111 and the location of the holding strips 54 is adjusted for proper format, etc.

Secondly, the switch 38 is closed and the handle 24 is moved to any convenient value of density, say zero, and the diaphragm of the lens 105 is adjusted until light balance is obtained on the photometric screen 37 for the portion of the negative transmitting the greatest amount of light, i. e., the shadow detail. In this circumstance, the apertures 48 which are not in light balance appear brighter than the remainder of the plate 46. One of the markers, say 131 is moved to this value of density, which can be done readily in the darkened room by bringing it into confronting position with respect to the handle 24.

Thirdly, the handle 24 is adjusted to achieve light balance at a place on the screen 37 corresponding to some important high light—say the sky or light colored apparel. This may correspond to the densest area of the negative in which case the apertures 48 not in light balance appear darker than the remainder of plate 46. The second marker, say 127, is then moved into the position corresponding to this latter position of the handle.

Fourthly, the handle 24 is again adjusted to achieve light balance at a portion of the screen 37 corresponding to some important portion of the negative of medium density, say the face of the subject. The third marker, say 129 is moved to a position confronting handle 24 at this last setting. If there are more than three markers, it is possible to indicate in the manner described the densities of as many selected portions of the negative as there are markers. Markers 127 and 131 are provided with projections 60 and 61 respectively, which will engage the handle 24, thus resulting in automatic setting of said markers at the extreme positions of the handle 24. If desired, such engagement means may be provided upon only one of the markers. Additionally, marker 129 may be permanently connected to the handle 24 as by a mechanical link (not shown). This will result in automatic setting of the marker at a position intermediate that of markers 127 and 131.

Fifthly, the top of the control housing 115 is illuminated with any suitable light, preferably a substantially white light, and disk 137 is rotated until the relationship among the high light, medium lights, and shadows desired in the print to be made is found on one of the rings 161–167, that is until the markers 131, 129 and 127 respectively confront segments of one of the scale rings which are of the desired shades. For example, let the positions of the markers as shown in Fig. 3 represent the densities encountered in the negative of the portrait of person, and let the marker 131 set at the density zero represent the density on the negative of a dark suit of clothes, the marker 129 set at 0.3 represent the density of the face of the subject, and the marker 127 set at 0.8 represent the density of a white shirt. It can be seen by comparing various settings of the disk 137 that only the gray scale ring 167 contains shades suitable for these three parts of the subject. Disk 137 is shown in the proper position in Fig. 3 and it can be seen that it will show the shirt almost completely white, in accordance with the segment 171 but still containing a certain amount of detail, the face will appear a medium gray tone, represented by the segment 173, and the suit will appear dark gray, as represented by the segment 175. As an example, scale ring 167 can be made of paper having contract grade No. 4. Papers of other contrast grades will not produce this desired balance of tones, as may be seen by examining the rings 161, 163 and 165. After the proper setting is achieved by manipulating the disk 137, the arrow 155 indicates directly the proper exposure time which is seen in Fig. 3 to be 11 seconds. The electronic timer is adapted to automatically provide the indicated exposure. With the white light turned off and the switch 38 closed, the operator merely needs to place a sheet of contrast No. 4 paper in the easel and press the button 144 to obtain a correctly exposed positive with the desired balance of lights and shadows.

Let it be assumed that the examination of the balance of lights and shadows as described heretofore indicates that none of the scale rings contains the desired scale of shades. For example, assume that there is no scale ring 167. In that case ring 165 is the one that is most nearly suitable. However, the shirt of the subject will come out quite dark while the face and suit are satisfactorily balanced. Assume that disk 137 is in the proper position as it is shown in Fig. 3 to provide the correct exposure time for the face and suit, namely, 11 seconds. To correct for the shade of the shirt, the operator needs only to turn the disk 137 until the marker 127 confronts the segment on the ring 165 representing the desired tone for the shirt, and to read the time on the dial 157 indicated by indicator arrow 155 for this last setting. Assume that this is 7 seconds. To achieve the desired overall balance, the button 144 is pressed to expose the print for 11 seconds, but in the interim the shirt is dodged for 4 seconds, this being the difference between 11 and 7. In this manner the desired overall result is obtained simply and precisely, without the use of test prints, etc.

While in the embodiment herein described three markers are used to permit ready alignment of the image-density at the selected points with the gray scale rings, it is evident that a greater or a lesser number of markers can also be employed. Under certain circumstances, shorter markers or arrows might be used, or markers might be eliminated altogether. In this latter instance, the operator merely aligns visually the image-density readings on scale 26 with the various tonal values on the rings 161, 163, 165 and 167. This procedure is not as satisfactory as the use of markers, but it may be resorted to with fairly good results if the quality requirements are not stringent.

When exposing very thin or translucent photographic printing paper it may be found desirable to place a sheet of thin, opaque sheet of paper between sheet 46 and the sheet of the photosensitive paper during the exposure. This precaution eliminates a pattern which might result from reflection of light from the apertured sheet 46. Likewise, the circuit in Fig. 3 may be modified so as to provide a source of electrical energy to the enlarger 102 and the photometric unit of easel 100 during the process of focusing and density exploration as described, and a separate source of supply to the enlarger only during the period of exposure of the final positive print. This is a refinement which can be readily incorporated by any person skilled in the art and will not be described here in detail. The calibration of my contrast and exposure selector as hereinbefore described is correct and accurate as long as there is no major change in the various factors which affect sensitivity and contrast of paper. Sometimes, there are changes in conditions such as line voltage, the temperature or concentration of the developing solution, etc. which significantly affect the speed of the photographic paper, although having a relatively minor effect upon the contrast range of the paper. Whenever it is suspected that such changes have taken place, the apparatus of my invention may be readily and quickly calibrated as follows: With switch 38 closed, the handle 24 is set to any desired value of negative density, say $d$, which would ordinarily result in a medium gray exposure of paper of the type to be tested in any convenient length of time, say $t$ seconds, and the arrow 155 is set to $t$ seconds. In a typical situation, $d$ may be 1.0 and $t$ may be 10. With no negative in holder 105, the light from the enlarger is adjusted as by manipulation of the diaphragm of the lens 107 until balance is obtained at the photometric screen 37. Switch 38 is then opened and a sample of the paper to be investigated is exposed to the light from enlarger for the time $t$. This sample is developed and fixed and freed of surface moisture by means of blotting paper or the like. The surface density of the sample so prepared is compared with the tones of the gray step ring on the disk 159 which is of the same contrast grade as the sample. When a segment of the ring is found having density equal, or very nearly equal to that of the sample, knob 169 is loosened and the disk 159 is adjusted to cause the last mentioned segment to confront the density $d$ on scale 26, while at the same time the disk 137 is held in position such that the indicator 155 continues to be set at the time $t$ on scale 157. Thereupon the knob 169 is tightened to fix the adjustment and the apparatus is ready for use. It is desirable that the calibration procedure just described be performed with a sample photosensitive material of high contrast, such as No. 3 or No. 4 because this results in a more accurate calibration of the instrument than if low contrast paper were employed.

If it is suspected that rings 161, 163, etc. are differently affected by the changes in line voltage, etc., calibration may be performed separately for each of these rings, the proper position of the disk 159 (carrying the step wedge rings) with respect to disk 137 (carrying the indicator 155) being marked on disk 137 with lines suitably identified as $a$, $b$, $c$, etc. as is shown in Fig. 3. Then in use, if gray step ring 161 is found to be the one to use, the boundary between the lightest segments and the darkest segments is set opposite the point $a$ on the disk 137; if ring 163 is to be used, the said boundary is set opposite point $b$, etc. Instead of a single disk 159 carrying concentric rings, several disks of progressively smaller diameter may be used each carrying but a single ring, all of these disks being clamped by the knob 169. In this manner the relative position of each disk in relation to each other and to the pointer 155 may be readily adjusted.

Several disks similar to disk 159 may be prepared each for a different series of photosensitive papers, and they can be installed as needed in the calculator portion of the control unit by removing the knob 169, changing the disks and replacing the knob.

Instead of exhibiting variations obtained with papers of different contrast values, rings 161, 163, etc. can be all made of the same grade of paper, and treated differently for example by exposing through different filters as is done in the case of commercially available variable contrast papers. Also, the term "gray-scale" is not limited to shades of black and white. Rings 161, 163, etc. may represent the effect of toning in sepia, gold tone, blue tone, etc.; or they can be in colors to represent different degree of saturation of certain primary colors with different exposure times to determine the optimum exposure of a color print in terms of densities of primary colors on a color transparency. Other uses will be evident to persons skilled in the art.

It will be recognized that one of the important advantages of the invention is the provision of a photometric screen in combination with a calculator, said screen being, for practical purposes, at—or very nearly at—the exact plane of the print to be exposed, since the print rests upon the screen. In my Patent No. 2,732,757, this advantage is approximately achieved by making the case containing the photometric screen exceptionally shallow. However, with the aid of the invention herein described, the photometric screen is placed substantially at the exact location of the photographic paper, resulting in very accurate measurement of projected density.

My invention is also adapted for use in contact printing. The procedure is similar to that used for projection printing, except that the photometric easel 100 is not used. Instead of being connected to the enlarger, the cord 118 is connected to the lamp or lamps within the contact printer. Before using, the instrument is calibrated in the following manner: A sheet of suitable photographic paper, preferably of high contrast, say No. 4 is exposed in the contact printer, with the negative removed, for varying time intervals, until an interval is selected which causes a medium gray tone to be obtained after development and fixation, for example, the tone represented by the segment 173. It should be observed that since no negative is present, the transmission density is zero. Therefore, with the disk 137 rotated until the indicator 155 confronts the selected time, the knob 169 is loosened and the disk 159 is rotated until the desired gray tone confronts the density zero on scale 26. Thereupon, the knob 169 is tightened and the instrument is calibrated and ready for use. In using the instrument for contact printing, the density values for the various portions of the negative are ascertained by a conventional transmission densitometer, and the markers 127, 129 and 131 are set at such values. Thereupon, the disk 137 is rotated until the desired tonal ranges are made to confront the markers, whereupon the indicator 155 will point to the correct exposure time for the negative under consideration and the chosen paper. Since the timer portion is coupled to the handle 24 carrying the exposure indicator 155, the lamp within the contact printer will be energized for the correct time to produce a satisfactory exposure. If especially designed for contact printing, the photometric easel 100 may be entirely omitted, leaving only the calculator 117 and the timer 143.

Another form of my invention may be obtained by omitting the timer portion, and leaving solely the calculator 117 and the photometric easel 100. The values of exposure time in seconds obtained from scale 157 of the timer can be applied to the enlarger manually. While the utility of this modification is not as great as when the timer is used, nevertheless there is still an important saving of time over the conventional methods of exposure selection.

In a still further form, the calculator portion can be used alone, still offering a great deal of advantage over conventional calculators. For this purpose an auxiliary densitometer or photometric device is required such as described in my patent, above identified, and which is employed to determine the projection density, in density values, of the negative to be printed. For use for projection printing, for example, it is desirable to calibrate the calculator as follows: Firstly, without the negative in the negative holder, the light from the enlarger is adjusted, as by manipulation of the enlarger lens diaphragm until it corresponds to the zero density reading of said auxiliary densitometer. Secondly, a sheet of printing paper, preferably of high contrast, say No. 4, is exposed to the same light for varying time intervals until an interval of time is selected which causes a medium-gray tone to be obtained after full development and brief fixation, for example, the tone represented by the segment 173. The same printing papers should, of course, be used as were used in making scale rings 161, 163, 165 and 167. With the disk 137 rotated until the indicator 155 confronts the selected time interval, the knob 169 is loosened and the disk 159 is rotated until the segment 173 confronts the density zero on scale 26. Thereupon, the knob 169 is tightened and the instrument is ready for use. The negative is inserted in the negative holder and the densities values for, say, three important portions of the negative are ascertained by means of said auxiliary photometric device. Following this, the markers 127, 129 and 131 respectively are set manually to positions opposite these three density values on scale 28 and the disk 137 is manipulated until the desired tonal ranges are made to confront these markers; thereupon the correct exposure time is indicated by the indicator 155. As pointed out in my patent, the photometric device thereof may be calibrated in terms of light transmitted through the negative to the easel of the device. When used in this manner, the calculator portion can be left mounted on the control housing 115, or it can be removed by loosening the set-screw 142 and removing the nut 30, which will permit lifting the calculator portion from the housing 115. The pinion 20, the lever 22 and the handle 24 are then removed from the post 21, and the calculator can be used as a separate device.

It should be noted that the calculator herein described has a scale 26 calibrated in terms of density, which is defined technically as the logarithm to the base 10 of the ratio of light impinging upon the negative, to the light leaving the negative. In projection printing what is measured is "projection density" of the various selected portions of the negative image, that is, the logarithm to the base 10 of the ratio of light impinging upon the easel with the image removed from the holder to that impinging upon the easel at said selected portions with the image placed in the holder.

Instead of measuring projection density, direct measurements of the emitted light from the various selected portions of the image can be made by means of a photoelectric photometer, and the logarithm of this value of light, termed "light value" may be used in lieu of density readings. The scale 26 would be recalibrated in this last eventuality since increasing numbers of light value correspond to decreasing numbers of density. These alternative representations of the varying amounts of light transmitted by the various portions of the image are encompassed in the appended claims by the term "image density." The principal consideration is that scale 26 is the scale upon which are entered density, projection density or light values originating from the image to be reproduced and the term "image density" is intended to embrace the measurements obtained by the various alternative methods of measurement. In the same way, where the term "densitometer" is used herein in the specification and claims, it is intended to embrace any photometric device for the measurement of the light-transmission characteristic of, or the projection density of, or the illumination from, selected portions of the image to be reproduced in response to light transmitted by said portions from a source of light.

The position of some of the scales may be altered. For instance, the indicator 155 may be placed on the disk 28 in the position occupied by the scale 157, and the scale 157 may be placed on disk 137. With such a reversal, the direction of the scale 157 would have to be reversed as is obvious.

Instead of placing the image density scale and the adjustable markers 127, 129, etc., on a stationary carrier (like the disk 28) and the gray scales on a movable carrier (like the disk 137) the gray scales may be placed on a stationary carrier and the image density scale and the markers may be placed on a movable carrier. The principle involved in this modification can be readily visualized by assuming that the disks 137 and 159, knob 169, scales 161, 163, etc., and the shaft 135 are held stationary in space, and the manipulation of the apparatus is performed by rotating the container 101. As another alternative arrangement, it is possible to couple the image density scale and the markers to the timer control and to arrange the gray scales on a stationary carrier. As still another alternative, the gray scales may be coupled to the densitometer control, and the image density scale and the markers may be placed on a stationary carrier. Other alternative arrangements can be similarily produced.

It is evident that some embodiments of my invention, for example that shown in Fig. 1, do not require the presence of the image density scale and the exposure-time scale. This is because the markers 127, 129, etc. are correctly set in place in response to the image density balancing procedure performed in conjunction with the photometric easel 100 without reference to the image density scale, and subsequently the rheostat 139 establishes the correct exposure time in response to the adjustment of the gray scale carrier 137 with respect to the setting of the markers, without reference to the time scale. The image density scale is necessary only in embodiments which are intended for use with separate densitometers and the time scale is necessary only in embodiments to be used with separate timing devices, as hereinbefore described.

As a further modification, the exposure selector or calculator may be in the form of a straight slide-rule. Such an embodiment is illustrated in Figs. 7 to 10, and is shown as being incorporated with the housing 115 in place of the selector and part of the control apparatus shown in Figs. 1 to 6. The body portion 200 of the slide-rule is of conventional construction and is fastened to the housing 115 by means of screws 205 placed at either end of the body 200, one of which is shown in Fig. 7. The slide 202 is adapted to move in the ways 203 after the manner of an ordinary slide-rule. At the upper side thereof, the slide has several longitudinal slots 204, 206, 208, and 210, which have the shape of an inverted T and which are capable of receiving the straight, strip-form gray scales 212, 214, 216 and 218. The slide carries the logarithmic time scale 220 upon a longitudinal margin thereof. An exposure-time indicating member 222 is mounted adjustably in longitudinal slot 224 in one edge of the body portion 200 and is adapted to cooperate with time scale 220. An image density scale 225 is located along the margin of the body portion remote from the time indicator 222. Such scale may cover any suitable range of image density, provided that the intervals on this scale covering a change of image density equal to 1.0 are made to conform substantially in length to the intervals on the time scale 220 covering a ten-fold change in time. The settings of image density are indicated by means of the markers 226 and 230 which are slidably positioned on a longitudinal supporting bar 232 which is fastened to the body member 200 by means of screws 234 and 236, and the marker 228 which is slidably positioned in the longitudinal T-shaped slot 238 provided in the body member 200. The desired degree of friction between these respective markers and their supports is provided by means of spring members 240, 242, and 244.

The straight gray scale strips are prepared in a manner analogous to that employed in the preparation of the circular gray-scales employed in the embodiment previously described, with the difference that a straight optical step-wedge is used. As an alternative method of preparation, these gray-scales may be prepared by exposing sections thereof for exponentially increasing time intervals to light of constant intensity. This latter alternative method is not as accurate as the step-wedge method because of the failure of certain photographic materials to follow the exposure reciprocity law. The principal consideration to be observed is that the logarithm of exposure to which these gray-scales are subjected at various intervals along the length of the scale should be approximately in conformity with the image density intervals on the scale 225. Scales 212, 214, 216 and 218 may represent the density tonal value-exposure relationships of photographic paper of progressively increasing contrast, the scale 212 corresponding, for example, to a soft-contrast paper and the scale 218 to a high-contrast paper. The several gray-scales are placed in their respective slots in such position that the sections thereof which have been subjected to corresponding amounts of exposure are in alignment with each other. If it is discovered at any time that there is a variation in the density tonal value-exposure characteristics of commercially available papers, the scales can be adjusted with respect to each other to compensate for this variation. The calibration of the device to provide the proper setting of the exposure-indicating member 222, and the adjustment thereof, will be hereinafter described.

To operatively coordinate the slide-rule with the photometric device 100 in Fig. 1, a straight potentiometer-type rheostat 248 is used in place of the circular rheostat 14 shown in Fig. 4. The movement of the marker 228 is arranged to cause similar and simultaneous movement of the slide contact 246 of the potentiometer rheostat 248, The rheostat 248 is mounted adjacent to one wall of the housing 115 by means of the supporting posts 247, and the slide carrier 250 which supports the slide contact 246 is mounted for movement longitudinally of the rheostat in the elongated slot 249 in said housing 115. The coupling member 252 is attached to the projection portion of slide carrier 250. The coupler 252 also serves as a handle in the operation of the device. Said coupler has two upward projections 254 and 256 which embrace the marker 228 and transmit motion from the coupler to the marker. The slide contact 246 has a terminal screw 14B and the potentiometer winding has end terminals 14A and 14C. These terminals are connected in the circuit shown in Fig. 4 in place of the similarly numbered terminals of the potentiometer rheostat 14.

The windings of the rheostat 248 may be tapered as shown in Fig. 8 so that the position of the marker 228 along the image density scale corresponds to the logarithm of intensity of the light impinging upon the photometric easel 100 when light balance is attained. The light-balancing operation is carried out for selected portions of the negative in the same manner as hereinbefore described in connection with the embodiment of Figs. 1 to 6. It is convenient first to produce light balance at the darkest significant portion of the negative by movement of the handle 252, and to move the marker 226 until it is adjacent to the marker 228; secondly, to adjust the marker 228 by movement of the handle 252 to achieve light balance at the lightest significant portion of the negative and to move the marker 230 until it is adjacent to the marker 228; and thirdly, leaving the markers 226 and 230 in said positions, to adjust the marker 228 to achieve light balance at some intermediate-density portion of the negative. Thereupon, the face of the slide-rule is illuminated externally with white light and the slide 202 is adjusted until the desired tonal values for the portions of the print corresponding to the selected portions of the negative appear upon one of the gray-scales at the sections thereof confronting the corresponding markers. The exposure time to achieve the desired rendition upon the paper as represented by said gray scale will be indicated upon the scale 220 by the exposure time indicating member 222. The desired exposure time can be applied manually to the enlarger bulb 103. As an additional refinement, the slide 202 may be connected to the timer control rheostat 139 by means of a rack and pinion arrangement as illustrated in Fig. 10 which will produce automatic setting of the exposure timer mechanism. In such an arrangement, the rack 260 is operatively connected to slide 202 so as to move with said slide, and pinion 262 is fixedly mounted on shaft 135, whereby movement of the slide causes adjustment of the movable contact of rheostat 139 and provides automatic control of the exposure time. Suitable accommodation and support is provided for rack 260 in housing 115.

The calibration of the indicator 222 is performed as follows: With the marker 228 adjusted to any convenient value of image density, say 1.0, the light from the enlarger 102 is adjusted to achieve light balance and a test strip of photographic paper corresponding to one of the gray scale strips, say 218, is placed on easel 100 and exposed to said light for a length of time, say $t$ seconds. The time $t$ is selected so that the test strip will turn an intermediate shade of gray color after full development and brief fixation. Thereupon, the slide 202 is adjusted until the marker 228 confronts the section of the gray-scale 218 which has a corresponding gray color, and the exposure time indicator 222 is set to confront the time $t$ on scale 220.

The slide-rule calculator may be detached from the housing 115 by removing the screws 205, and may be used as a separate exposure calculator in conjunction with an external photometer in a manner quite similar to that described hereinbefore for the calculator 117.

Another embodiment of my invention in the form of a combined densitometer and exposure time calculator wherein the gray scales and the densitometer control element are coupled together upon a common carrier is illustrated in Figs. 11–13. As will be seen as the description proceeds, this device is somewhat more simple in construction and incorporates features of convenience not found in forms of the invention above described.

In this structure, a shallow box or casing 300 is subdivided into two spaces or chambers, space 302, which contains an electric lamp 303, and space 304 which underlies the photometric control element and the calculator. Light from the lamp bulb 303 enters the space 304 through a slot 305. A heat or color filter may be installed in the slot 305, if desired. The space 304 is covered by a rectangular plate 306 which is preferably opaque and is provided with an opening 308 the outline of which appears in dotted lines in Fig. 11. The space 302 is covered by an opaque plate 310 which can be made of plastic, metal etc., painted or covered with a light-colored coating to form a photometric screen 311. Plate 310 is advantageously held in place by hinges 312, or otherwise fastened so that it may be raised as shown in the dotted outline 310', for the purposes hereinafter described. The plate 310 is provided with one or more apertures 314 which may be of various sizes and shapes and which, together with the upper surface of the plate 310, comprises a comparison element in the photometric screen after the teaching of my Patent No. 2,732,757.

Along the opposite side of box 300 is a bar 316 fastened at its two ends by the screws 318. As shown, the box 300, the plate 306, the screen-plate 310 and the bar 316 form a slot in which a slide-plate 320 may be moved by manual manipulation after the manner of a slide rule.

The slide 320 may be made of metal, plastic or any other suitable material, and it may be opaque, translucent or transparent. In the latter two cases the light from the chamber 304 will shine through portions of the slide enabling the operator to read some of the scales in a darkened room. The slide 320 has a rectangular window 322, shown in dotted lines in Fig. 11, this window opening being covered by an optical density wedge 324 cemented or otherwise fastened to the plate. The density wedge is a well known form of variable light transmission element which may be produced photographically or by dispersion of pigment in a transparent plastic sheet or by any other suitable process. The variable light transmission characteristics of the wedge are such that its density is a linear function of displacement of the wedge.

Immediately underlying apertures 314 or screen 310 is a translucent quasi-black body sheet 326 in the form of a graduated density wedge with orientation such that the direction of increasing density is opposite to that of density wedge 324. The density gradation of the two wedges is such that the light emerging through the apertures 314 is of uniform intensity whereby a light balance is achieved simultaneously at all of the apertures when the instrument is subject to uniform external illumination. The wedge 326 is arranged for adjustable motion in slide ways 325, a tab 327 being provided for such manipulation. In addition to rendering uniform the light reaching apertures 314 from below, wedge 326 may also be used for minor calibration of the instrument as hereinafter more fully described.

The light from the bulb 303 is reflected upwardly by a mirror 307, as indicated by the dot-dash lines in Fig. 12, and shines through the density wedge 324 and the quasi-black body sheet 326 and lights the apertures 314. A balance between the illumination from an image to be reproduced projected upon the surface 311 is achieved by manipulating the slide 320 after the manner of a slide rule, for the purpose of measuring the relative image density of selected portions of the image as and for the purposes hereinbefore fully explained. It will be understood that a plurality of apertures 314 are provided as a matter of convenience to permit the light balance to be accomplished at nearby points of an image without the necessity of moving the instrument which, of course, must be done to measure the relative image density of other portions of the image. A single aperture is sufficient, but somewhat less convenient.

It will be understood that other forms of variable light transmission means may be employed alternatively to the density wedges 324 and 326, the purposes of the invention being served by any such means which is capable of varying the intensity of the light at the apertures 314 in response to movement of an element such as slide 320.

The slide 320 has a plurality of grooves 328 in which may be installed the gray scales 330 representing the density tonal value-exposure relationships of various photographic media upon which the image is intended to be reproduced. These scales may be adjusted with respect to the slide 320 and with respect to each other in order to place them in suitable relative position as to their density-tonal value-exposure relationships. In order to enable these scales to represent a variety of such media, the bottom portion of the groves 328 may be provided with indicia 329 which help to relocate the scales 330 in correct position to suit the requirements of various media.

The bar 316 serves as a rail upon which are arranged a plurality of markers 332 which allow for simultaneous observation of the corresponding density tonal values resulting on various gray scales for given conditions of exposure.

The slide 320 has a hole 336 provided therein which is visible because of the illumination of the chamber 304 of the casing reaching through the slit 338 provided in the cover 306, and shown in dotted lines in Fig. 11 and in cross-section in Fig. 12. The hole 336 serves as a density indicator. The markers may be set to given density indications in a darkened room by sliding them on the bar 316 over the locations of the hole 336 corresponding to the measurements of the relative image density of the various selected portions of the image to be reproduced. (It should be noted that in referring to "measurement of the relative image density" it is not intended to imply that the measurement is in terms of a numerical quantity, but rather that it is in terms of the position of the slide 320 relative to the casing 300. However, if it is desired to read actual numerical values of relative image density, a density scale 334 may be provided upon the bar 316, or upon any similarly convenient place. The density scale 334 is not needed for the calibration or operation of the instrument.)

The exposure-time scale 342 may be placed in an adjustable position in the slot 344 and the time indicator 346 may be attached to the plate 310, as shown; or, conversely, the exposure-time scale may be arranged on the plate 310 and the time indicator may be placed in adjustable manner in the slot 344. In this latter case, the direction of increasing time is opposite to that shown upon the scale 342. The exposure-time scale may be placed at other convenient locations. For example, a translucent exposure-time scale may be arranged in the slit 338, and read through the hole 336 which may be suitably enlarged. In this event the hole 336 will serve both as a density indicator means and as the time indicator means enabling the operator to set the markers and read the exposure time in a darkened room. If desired, the gray scales together with the time scale or time indicator member may be attached to a separate carrier adapted to be conveniently fastened to and removed from the slide 320. Several sets of such scales may be prepared in advance corresponding to various photosensitive media, and installed upon the slide 320 as the need may arise.

The density gradations of the wedges 324, and 326, the gradation of the gray scales 330, the density scale 316, and the log time scale 342, all have interdependent linear spacial relationships, in accordance with the teaching hereinabove described. It should be noted that the gray scales 330 can be made by contact printing of the density wedge 324 on photographic media of various grades.

The instrument shown in Figs. 11–13 may be calibrated for given dark-room conditions in the following manner: The slide 320 is set to some intermediate density value by aligning the indicator hole 336 with one of the markers adjusted to any convenient intermediate position on the bar 316, and by adjusting the light from the enlarger to provide balance at the screen 311 without negative in the negative carrier. Thereupon a series of exposures are made with varying times on the photosensitive medium for which the calibration is being performed. Let us say that a medium gray tone is obtained on photosensitive paper of contrast grade 2 with exposure time of 7 seconds. The slide plate 320 is adjusted so that the time indicator points to 7 seconds on the time scale 342 and the gray scale for contrast number 2 is adjusted in slot 328 until said medium gray tone is in confronting relationship with said marker. The above operation may be repeated for various desired grades of photosensitive paper, thus placing the instrument in calibrated condition ready for use.

The instrument is used in the following manner: With the negative placed in the enlarger, the photometric area 311 is placed under the various selected portions of the image to be reproduced and the intensity of illumination therefrom is visually balanced against light emerging from the holes 314 by manipulation of the slide 320. Each time the relative density of the selected portions of the image is measured in this manner, one of the markers 332 is adjusted by alignment with the position of the hole 336 which is visible in the dark. After all the markers are set in this manner, and as a convenient means for illuminating the gray scales, the cover 310 may be lifted into position 310' and the light from the bulb 303 will then be allowed to shine upon the gray scales by reflection from the bottom portion of the cover as indicated by the dot-dash line in the drawing. The slide 320 may now be adjusted until the markers 332 are in confronting relationship with the selected tonal value on the gray scales 330 so as to produce the desired balance of tonal value for the various portions of the image to be reproduced. Thereupon the cover 310 is closed to bring the time indicator in time indicating relationship with respect to the time scale 342, thus indicating the exposure time which will produce said selected tonal values on the final print.

If the darkroom conditions, such as line voltage, temperature, etc., change, necessitating minor recalibration of the instrument, this may be done conveniently by means of the wedge 326. The position of this wedge is altered by moving the tab 327 along the edge of the plate 310 so as to change the calibration of the instrument without the need for readjusting the gray scales.

As an additional refinement, the slide 320 may be connected to a timer control rheostat, as 139 (Fig. 4), by means of a rack and pinion arrangement as shown in Fig. 10. This will produce automatic setting of the exposure timer mechanism. In such an arrangement, the rack 260 is operatively connected to slide 320 so as to move with said slide, and pinion 262 is fixedly mounted on the shaft 135, whereby movement of the slide causes adjustment of the movable contact of the rheostat 139 and provides automatic control of the exposure time. Suitable accommodation and support is provided for rack 260 in the housing 300.

As a further modification, the instrument may take a circular form with the gray scale, the density indicator means 336 and one or the other of the time scale and time indicator means being mounted upon a rotary member for simultaneous motion with said variable light transmission means and the markers, and the other of said time scale and time indicator means being mounted upon a stationary supporting member; or, conversely, the gray scale, the density indicator means 336 and one or the other of the time scale and time indicator means may be mounted on the stationary supporting member and the markers and the other of said time scale and time indicator means can be mounted on a shaft for rotary adjustment and for simultaneous motion with said variable light transmission means.

While the description herein is made principally in connection with the art of making photographic prints from a negative image, the apparatus described is equally applicable to the art of making photographic prints from a positive image upon a reversible type photosensitive medium. The preparation of gray scales from reversible type media is similar to that described hereinbefore, although it is evident that the density tonal value will be minimum for maximum illumination and vice versa when a reversible type medium is employed. The process of selection of contrast grade and exposure time is identical with that employed for conventional type photosensitive media.

This application is a continuation in part of my co-pending application, Serial No. 330,226, filed January 8, 1953, now abandoned.

Other modifications will occur to persons skilled in the art and are considered to be embraced within the spirit of the present invention.

What is claimed is:

1. Apparatus of the character described comprising a gray scale representing the density tonal value-exposure relationship which is characteristic of a photosensitive medium, a densitometer comprising two relatively movable members for measuring the relative image density of selected portions of an image in response to light transmitted by said portions from a source of light, said densitometer including an image density scale in connected relation with one of said two relatively movable members and an image density indicator member in connected relation to the other of said two relatively movable members for indicating upon said image density scale the relative image density of said selected portions of said image as measured by said densitometer, the image density intervals of said image density scale being in conformity with the exposure intervals of said gray scale, one or more adjustable markers arranged to be set in accordance with positions of said image density indicator member and to confront portions of said gray scale, a timer comprising two relatively movable parts for controlling the exposure time for said photosensitive medium, said timer including a time scale in connected relation with one of said relatively movable parts and a time indicator member in connected relation with the other of said relatively movable parts and arranged to indicate upon said time scale the exposure time for which said timer is set, means for establishing a positional relationship between one of said time scale and time indicator member and said gray scale and between the other of said time scale and time indicator member and the one of said densitometer members which is not in connected relation to said image density indicator member such that with one of said markers set in accordance with a position of said image density indicator member indicating the image density of a selected portion of said image in response to light transmitted by said selected portion from a source of given intensity and with a given tonal value of said gray scale in selected comparison position with respect to said marker said exposure time indicator member is set to indicate the exposure time required to produce said tonal value on said photosensitive medium with light transmitted by said selected portion of said image from said source of given intensity.

2. Apparatus of the character described comprising a gray scale representing the density tonal value-exposure relationship which is characteristic of a photosensitive medium, a densitometer comprising two relatively movable members for measuring the relative image density of selected portions of an image in response to light transmitted by said portions from a source of light, said densitometer including an image density scale in connected relation with one of said two relatively movable members and an image density indicator member in connected relation to the other of said two relatively movable members for indicating upon said image density scale the relative image density of said selected portions of said image as measured by said densitometer, the image density intervals of said image density scale being in conformity with the exposure intervals of said gray scale, one or more adjustable markers arranged to be set in accordance with positions of said image density indicator member and to confront portions of said gray scale, a timer comprising two relatively movable members for controlling the exposure time for said photosensitive medium, means for establishing a positional relationship between one of said timer members and said gray scale and between the other of said timer members and the one of said densitometer members which is not in connected relation with said image density indicator member such that with one of said markers set in accordance with a position of said image density indicator member indicating the image density of a selected portion of said image in response to light transmitted by said selected portion from a source of given intensity and with a given tonal value of said gray scale in selected comparison position with respect to said marker said timer is set to provide the exposure time required to produce said given tonal value on said photosensitive medium with light transmitted by said selected portion of said image from said source of given intensity.

3. Apparatus of the character described comprising a gray scale representing the density tonal value-exposure relationship which is characteristic of a photosensitive medium, a densitometer comprising two relatively movable members for measuring the relative image density of selected portions of an image in response to light transmitted by said portions from a source of light, said densitometer including an image density indicator member in connected relation to one of said two relatively movable members for indicating the relative image density of said selected portions of said image as measured by said densitometer, one or more adjustable markers arranged to be set in accordance with positions of said image density indicator member and to confront portions of said gray scale, a timer comprising two relatively movable timer members for controlling the exposure time for said photosensitive medium, means for establishing a positional relationship between one of said timer members and said gray scale and between the other of said timer members and the one of said densitometer members which is not in connected relation with said image density indicator member such that with one of said markers set in accordance with a position of said image density indicator member indicating the image density of a selected portion of said image in response to light transmitted by said selected portions from a source of given intensity and with a given tonal value of said gray scale in selected comparison position with respect to said marker said timer is set to provide the exposure time required to produce said given tonal value on said photosensitive medium with light transmitted by said selected portions of said image from said source of given intensity.

4. Apparatus of the character described comprising a gray scale representing the density tonal value-exposure relationship which is characteristic of a photosensitive medium, a densitometer comprising two relatively movable members for measuring the relative image density of selected portions of an image in response to light transmitted by said portions from a source of light, said densitometer including an image density indicator member in connected relation with one of said two relatively movable members for indicating the relative image density of said selected portions of said image as measured by said densitometer, a timer comprising two relatively movable members for controlling the exposure time for said photosensitive medium, means for establishing a positional relationship between one of said timer members and said gray scale and between the other of said timer members and the one of said densitometer members which is not in connected relation with said image density indicator member such that with said image density indicator member indicating the image density of a selected portion of said image in response to light transmitted by said selected portion from a source of given intensity and with a given tonal value of said gray scale in selected comparison position with respect to said image density indicator member said timer is set to provide the exposure time required to produce said given tonal value on said photosensitive medium with light transmitted by said selected portion of said image from said source of given intensity.

5. Apparatus of the character described comprising a gray scale representing the density tonal value-exposure relationship which is characteristic of a photosensitive medium, an image density scale, said image density scale and said gray scale being movable relative to each other and the image density values of said image density scale being positioned for comparison with the tonal values of said gray scale, the image density intervals of said image density scale being in conformity with the exposure intervals of said gray scale, a timer comprising two relatively movable members for controlling the exposure time for said photosensitive medium, means for establishing a positional relationship between one of said timer members and said gray scale and between the other of said timer members and said image density scale such that with an image density value of said image density scale representing the image density of a selected portion of an image in response to light transmitted by said selected portion from a source of given intensity and with a given tonal value of said gray scale in selected comparison position with respect to said image density value said timer is set to provide the exposure time required to produce said tonal value on said photosensitive medium with light transmitted by said selected portion of said image from said source of given intensity.

6. Apparatus of the character described comprising a gray scale representing the density tonal value-exposure relationship which is characteristic of a photosensitive medium, an image density scale, the image density intervals of said image density scale being in conformity with the exposure intervals of said gray scale, one or more markers movable relative to said gray scale and to said image density scale, said markers being adapted to be set in accordance with image density values of said image density scale and to confront portions of said gray scale, a timer comprising two relatively movable members for controlling the exposure time for said photosensitive medium, means for establishing a positional relationship between one of said timer members and said gray scale and between the other of said timer members and said image density scale such that with one of said markers set in accordance with an image density value of said image density scale representing the image density of a selected portion of an image in response to light transmitted by said selected portion from a source of given intensity and with a given tonal value of said gray scale in selected comparison position with respect to said marker said exposure time indicator member is set to indicate the exposure time required to produce said tonal value on said photosensitive medium with light transmitted by said selected portion of said image from said source of given intensity.

7. Apparatus of the character described comprising a gray scale representing the density tonal value-exposure relationship which is characteristic of a photosensitive medium, a densitometer comprising two relatively movable members for measuring the relative image density of selected portions of an image in response to light transmitted by said portions from a source of light, said densitometer including an image density scale in connected relation with one of said two relatively movable members and an image density indicator member in connected relation to the other of said two relatively movable members for indicating upon said image density scale the relative image density of said selected portions of said image as measured by said densitometer, the image density intervals of said image density scale being in conformity with the exposure intervals of said gray scale, one or more adjustable markers arranged to be set in accordance with positions of said image density indicator member and to confront portions of said gray scale, an exposure time scale and an exposure time indicator member in adjustable time-indicating relation with each other, means for establishing a positional relationship between one of said last mentioned two members and said gray scale and between the other of said last mentioned two members and the one of said densitometer members which is not in connected relation to said image density indicator member such that with one of said markers set in accordance with a position of said image density indicator member indicating the image density of a selected portion of said image in response to light transmitted by said selected portion from a source of given intensity and with a given tonal value of said gray scale in selected comparison position with respect to said marker said exposure time indicator member is set to indicate the exposure time required to produce said tonal value on said photosensitive medium with light transmitted by said selected portion of said image from said source of given intensity.

8. Apparatus of the character described comprising a gray scale representing the density tonal value-exposure relationship which is characteristic of a photosensitive medium, a densitometer comprising two relatively movable members for measuring the relative image density of selected portions of an image in response to light transmitted by said portions from a source of light, said densitometer including an image density indicator member in connected relation with one of said two relatively movable members for indicating the relative image density of said selected portions of said image as measured by said densitometer, an exposure time scale and an exposure time indicator member in adjustable time-indicating relation with each other, means for establishing a positional relationship between one of said last mentioned two members and said gray scale and between the other of said last mentioned two members and the one of said densitometer members which is not in connected relation to said image density indicator member such that with said image density indicator member indicating the image density of a selected portion of said image in response to light transmitted by said selected portion from a source of given intensity and with a given tonal value of said gray scale in selected comparison position with respect to said image density indicator member said exposure time indicator member is set to indicate the exposure time required to produce said tonal value on said photosensitive medium with light transmitted by said selected portion of said image from said source of given intensity.

9. Apparatus as claimed in claim 8 in which the gray scale comprises a plurality of sections representing respectively the density tonal value-exposure characteristics of a plurality of sensitized media of different characteristics, said sections being located in corresponding positions with respect to exposure time, whereby said apparatus enables the operator to select the appropriate characteristics of sensitized medium in addition to the appropriate exposure time.

10. Apparatus as claimed in claim 8 in which the gray scale comprises a carrier, a plurality of gray scale sections representing respectively the density tonal value-exposure characteristics of a plurality of photosensitive media of different characteristics, and means for supporting said sections in adjustable position on said carrier, whereby said apparatus enables the operator to select the photosensitive medium with the most appropriate characteristic for said photographic reproduction.

11. The apparatus as claimed in claim 8 in which the connected relation between the gray scale and the member connected thereto is an adjustable relation.

12. Apparatus of the character described comprising a gray scale representing the density tonal value-exposure relationship which is characteristic of a photosensitive medium, a densitometer comprising two relatively movable members for measuring the relative image density of selected portions of an image in response to light transmitted by said portions from a source of light, said densitometer including an image density indicator member in connected relation with one of said two relatively movable members for indicating the relative image density of said selected portions of said image as measured by said densitometer, one or more adjustable markers arranged to be set in accordance with positions of said image density indicator member and to confront portions of said gray scale, an exposure time scale and an exposure time indicator member in adjustable time-indicating relation with each other, means for establishing a positional relationship between one of said last mentioned two members and said gray scale and between the other of said last mentioned two members and the one of said densitometer members which is not in connected relation to said image density indicator member such that with one of said markers set in accordance with a position of said image density indicator member when indicating the image density of a selected portion of said image in response to light transmitted by said selected portion from a source of given intensity and with a given tonal value of said gray scale in selected comparison position with respect to said marker said exposure time indicator member is set to indicate the exposure time required to produce said tonal value on said photosensitive medium with light transmitted by said selected portion of said image from said source of given intensity.

13. The apparatus as claimed in claim 12 in which at least one of said adjustable markers is in connected relation with said image density indicator member such that setting said indicator member to a position automatically sets one of said markers to said position.

14. Apparatus of the character described comprising a gray scale representing the density tonal value-exposure relationship which is characteristic of a photosensitive medium, a densitometer comprising two relatively movable members for measuring the relative image density of selected portions of an image in response to light transmitted by said portions from a source of light, an exposure time scale and an exposure time indicator member in adjustable time-indicating relation with each other, means for establishing a positional relationship between one of said last mentioned two members and said gray scale and between the other of said last mentioned two members and one of said densitometer members such that with a given tonal value of said gray scale in selected comparison position with respect to the image density value of a selected portion of said image as measured by said densitometer in response to light transmitted by said selected portion from a source of given intensity said exposure time indicator member is set to indicate the exposure time required to produce said tonal value on said photosensitive medium with light transmitted by said selected portion of said image from said source of given intensity.

15. Apparatus of the character described comprising a gray scale representing the density tonal value-exposure relationship which is characteristic of a photosensitive medium, an image density scale, said image density scale and said gray scale being movable relative to each other with the image density values of said image density scale arranged for comparison with the tonal values of said gray scale, an exposure time scale and an exposure time indicator member in adjustable time-indicating relation with each other, the image density intervals of said image density scale and the exposure intervals of said exposure time scale being in conformity with the exposure intervals of said gray scale, means for establishing a positional relationship between one of said last mentioned two members and said gray scale and between the other of said last mentioned two members and said image density scale such that with an image density value of said image density scale representing the image density of a selected portion of an image in response to light transmitted by said selected portion from a source of given intensity and with given tonal value of said gray scale in selected comparison position with respect to said image density value said exposure time indicator member is set to indicate the exposure time required to produce said tonal value on said photosensitive medium with light transmitted by said selected portion of said image from said source of given intensity.

16. Apparatus of the character described comprising a gray scale representing the density tonal value-exposure relationship which is characteristic of a photosensitive medium, an image density scale, said image density scale and said gray scale being movable relative to each other with the image density values of said image density scale arranged for comparison with the tonal values of said gray scale, the image density intervals of said image density scale being in conformity with the exposure intervals of said gray scale, an exposure time scale and an exposure time indicator member in adjustable time-indicating relation with each other, means for establishing a positional relationship between one of said last mentioned two members and said gray scale and between the other of said last mentioned two members and said image density scale such that with an image density value of said image density scale representing the image density of a selected portion of an image in response to light transmitted by said selected portion from a source of given intensity and with a given tonal value of said gray scale in selected comparison position with respect to said image density value said exposure time indicator member is set to indicate the exposure time required to produce said tonal value on said photo-sensitive medium with light transmitted by said selected portion of said image from said source of given intensity.

17. Apparatus as claimed in claim 16 in which the gray scale comprises a plurality of sections representing respectively the density tonal value-exposure characteristics of a plurality of sensitized media of different characteristics, said sections being located in corresponding positions with respect to exposure time, whereby said apparatus enables the operator to select the appropriate characteristics of sensitized medium in addition to the appropriate exposure time.

18. Apparatus as claimed in claim 16 in which the gray scale comprises a carrier, a plurality of gray scale sections representing respectively the density tonal value-exposure characteristics of a plurality of photosensitive media of different characteristics, and means for supporting said sections in adjustable position on said carrier, whereby said apparatus enables the operator to select the photosensitive medium with the most appropriate characteristics for said photographic reproduction.

19. Apparatus of the character described comprising a gray scale representing the density tonal value-exposure relationship which is characteristic of a photosensitive medium, an image density scale, the image density intervals of said image density scale being in conformity with the exposure intervals of said gray scale, one or more markers movable relative to said gray scale and to said image density scale, said markers being adapted to be set in accordance with image density values on said image density scale and to confront portions of said gray scale, an exposure time scale and an exposure time indicator member in adjustable time-indicating relationship with each other, means for establishing a positional relationship between one of said last mentioned two members and said gray scale and between the other of said last mentioned two members and said image density scale such that with one of said markers set in accordance with an image density value of said image density scale representing the image density of a selected portion of said image in response to light transmitted by said selected portion from a source of given intensity and with a given tonal value of said gray scale in selected comparison position with respect to said marker said exposure time indicator member is set to indicate the exposure time required to produce said tonal value on said photosensitive medium with light transmitted by said selected portion of said image from said source of given intensity.

20. Apparatus of the character described comprising a gray scale representing the density tonal value-exposure relationship which is characteristic of a photosensitive medium, a light meter comprising two relatively movable members for measuring the relative intensity of light transmitted by selected portions of an image from a source of light, said light meter including a light intensity indicator member in connected relation with one of said two relatively movable members for indicating the relative intensity of said transmitted light as measured by said light meter, an exposure time scale and an exposure time indicator member in adjustable time-indicating relation with each other, means for establishing a positional relationship between one of said last mentioned two members and said gray scale and between the other of said last mentioned two members and the one of said light meter members which is not in connected relation to said light intensity indicator member such that with a given tonal value of said gray scale set in selected comparison position with respect to a given value of intensity of transmitted light as indicated by said light intensity indicator member said exposure time indicator member is set to indicate upon said exposure time scale the exposure time required to produce said tonal value on said photosensitive medium with light of said given value of intensity.

21. Apparatus of the character described comprising a gray scale representing the density tonal value-exposure relationship which is characteristic of a photosensitive medium, a densitometer comprising two relatively movable members for measuring the relative image density of selected portions of an image in response to light transmitted by said portions from a source of light, said densitometer including an image density indicator member in connected relation with one of said two relatively movable members for indicating the relative image density of said selected portions of said image as measured by said densitometer, a plurality of adjustable markers arranged to be set in accordance with positions of said image density indicator member and to confront portions of said gray scale, an exposure time scale and an exposure time indicator member in adjustable time-indicating relation with each other, means for establishing a positional relationship between one of said last mentioned two members and said gray scale and between the other of said last mentioned two members and the one of said densitometer members which is not in connected relation to said image density indicator member such that with one of said markers set in accordance with a position of said image density indicator member when indicating the image density of a selected portion of said image in response to light transmitted by said selected portion from a source of given intensity and with a given tonal value of said gray scale in selected comparison position with respect to said marker said exposure time indicator member is set to indicate the exposure time required to produce said tonal value on said photosensitive medium with light transmitted by said selected portion of said image from said source of given intensity.

22. Apparatus of the character described comprising a gray scale representing the density tonal value-exposure relationship which is characteristic of a photosensitive medium, an image density scale, the image density intervals of said image density scale being in conformity with the exposure intervals of said gray scale, a plurality of markers movable relative to said gray scale and to said image density scale, said markers being adapted to be set in accordance with image density values on said image density scale and to confront portions of said gray scale, an exposure time scale and an exposure time indicator member in adjustable time-indicating relation with each other, means for establishing a positional relationship between one of said last mentioned two members and said gray scale and between the other of said last mentioned two members and said image density scale such that with one of said markers set in accordance with an image density value of said image density scale representing the image density of a selected portion of said image in response to light transmitted by said selected portion from a source of given intensity and with a given tonal value of said gray scale in selected comparison position with respect to said marker said exposure time indicator member is set to indicate the exposure time required to produce said tonal value on said photosensitive medium with light transmitted by said selected portion of said image from said source of given intensity.

23. Apparatus as claimed in claim 22 in which the gray scale comprises a plurality of sections representing respectively the density tonal value-exposure characteristics of a plurality of sensitized media of different characteristics, said sections being located in corresponding positions with respect to exposure time, whereby said apparatus enables the operator to select the appropriate characteristics of sensitized medium in addition to the appropriate exposure time.

24. Apparatus of the character described comprising a gray scale representing the density tonal value-exposure relationship which is characteristic of a photosensitive medium, a light balance type densitometer for measuring the relative image density of selected portions of an image in response to light transmitted by said portions from a source of light, said densitometer comprising two relatively movable densitometer members, one of said densitometer members including a screen member having a side exposed for viewing purposes and for reception of external illumination from said image, said screen member having a light transmitting area therein the remainder of said screen member being substantially opaque and diffusely reflective on said exposed side thereof, a source of internal illumination on the side of said screen member opposite said exposed side thereof, said light transmitting area being exposed to said source of internal illumination for visual comparison against the light from said image, the other of said densitometer members comprising light adjusting means adapted to vary the intensity of said internal illumination at said light transmitting area for achieving light balance by mutual adjustment of said relatively movable members, said densitometer including an image density indicator member in connected relation with one of said two densitometer members for establishing the position of one of said densitometer members with respect to the other corresponding to the relative image density of said selected portion of said image being measured by said densitometer, means for supporting said gray scale upon the said densitometer member which includes said image density indicator member, one or more markers arranged for adjustable setting upon the said densitometer member not connected with said image density indicator member and confronting portions of said gray scale and adapted to be positioned in accordance with the position of said image density indicator member, an exposure time scale and an exposure time indicator member in adjustable time-indicating relation with each other, means for establishing a positional relationship between one of said last mentioned two members and one of said densitometer members and between the other of said last mentioned two members and the other of said densitometer members such that with one of said markers set in accordance with a position of said image density indicator member under the condition of light balance for a selected portion of said image in response to light transmitted by said selected portion from a source of given intensity and with a given tonal value of said gray scale in selected comparison position with respect to said marker said exposure time indicator member is set to indicate the exposure time required to produce said tonal value on said photosensitive medium with light transmitted by said selected portion from said source of given intensity.

25. Apparatus as claimed in claim 24 in which said gray scale comprises a plurality of sections representing respectively the density tonal value-exposer relationship of a plurality of sensitized media of different characteristics supported upon said densitometer member in corresponding positions with respect to exposure time whereby said apparatus enables the operator to select the appropriate characteristics of sensitized media in addition to the appropriate exposure time.

26. Apparatus as claimed in claim 24 in which said light transmitting area of said screen member comprises a plurality of spaced-apart apertures to permit said light balance to be achieved at several spaced apart points of the image at a single position of the apparatus.

27. Apparatus as claimed in claim 24 and including means for directing light from said source of internal illumination upon said gray scale to illuminate the same and permit the setting of said gray scale with respect to said markers in a darkened room.

28. Apparatus as claimed in claim 24 and including a variable light transmission element, said variable light transmission element being positioned between the source of internal illumination and the light transmitting area of the screen member, and means for adjusting the position of said variable light transmission element to adjust the calibration of said densitometer.

29. Apparatus as claimed in claim 24 and including an image density scale and means for supporting said scale in relation to the density indicator member such that said density indicator member indicates upon said density scale values of relative image density.

30. Apparatus as claimed in claim 24 in which the density indicator comprises an aperture exposed to the source of internal illumination whereby the settings of said markers may be performed in a darkened room.

31. Apparatus of the character described comprising a gray scale representing the density tonal value-exposure relationship which is characteristic of a photosensitive medium, a light balance type densitometer for measuring the relative image density of selected portions of an image in response to light transmitted by said portions from a source of light, said densitometer comprising two relatively movable densitometer members one of said densitometer members including a screen member having a side exposed for viewing purposes and for reception of external illumination from said image, said screen member having a light transmitting area therein the remainder of said screen member being substantially opaque and diffusely reflective on said exposed side thereof, a source of internal illumination on the side of said screen member opposite said exposed side thereof, said light transmitting area being exposed to said source of internal illumination for visual comparison against the light from said image, the other of said densitometer members comprising light adjusting means adapted to vary the intensity of said internal illumination at said light transmitting area for achieving light balance by mutual adjustment of said relatively movable members, said densitometer including an image density indicator member in connected relation with one of said two densitometer members for establishing the position of one of said densitometer members with respect to the other corresponding to the relative image density of said selected portion of said image being measured by said densitometer, means for supporting said gray scale upon the said densitometer member which includes said image density indicator member, a plurality of markers arranged for adjustable setting upon the said densitometer member not connected with said image density indicator member and confronting portions of said gray scale and adapted to be positioned in accordance with positions of said image density indicator member, an exposure time scale and an exposure time indicator member in adjustable time-indicating relation with each other, means for establishing a positional relationship between one of said last mentioned two members and one of said densitometer members and between the other of said last mentioned two members and the other of said densitometer members such that with each of said markers set in accordance with a position of said image density indicator member under the condition of light balance for each of a plurality of selected portions of said image in response to light transmitted by said selected portions from a source of given intensity and with a given tonal value of said gray scale in selected comparison position with respect to said markers said exposure time indicator member is set to indicate the exposure time required to produce said tonal value on said photosensitive medium with light transmitted by said selected portions from said source of given intensity.

No references cited.